United States Patent
Battaglia et al.

(10) Patent No.: US 9,580,647 B2
(45) Date of Patent: *Feb. 28, 2017

(54) SIMULTANEOUS OPTIMIZATION OF ABSORPTION AND EMISSION OF NANOCRYSTALS

(75) Inventors: David Battaglia, Fayettville, AR (US); Haogua Zhu, Fayettville, AR (US); Qiang Zhang, Fayettville, AR (US); Suresh Sunderrajan, Pittsford, NY (US); Tiecheng Qiao, Webster, NY (US)

(73) Assignee: Najing Technology Corporation Limited, Hangzhou, Zhejiang (CN)

( * ) Notice: Subject to any disclaimer, the term of this patent is extended or adjusted under 35 U.S.C. 154(b) by 98 days.

This patent is subject to a terminal disclaimer.

(21) Appl. No.: 13/637,225

(22) PCT Filed: Jun. 30, 2010

(86) PCT No.: PCT/US2010/001873
§ 371 (c)(1),
(2), (4) Date: Jan. 3, 2013

(87) PCT Pub. No.: WO2011/109007
PCT Pub. Date: Sep. 9, 2011

(65) Prior Publication Data
US 2013/0134366 A1 May 30, 2013

Related U.S. Application Data

(60) Provisional application No. 61/339,160, filed on Mar. 1, 2010.

(51) Int. Cl.
*C09K 11/54* (2006.01)
*B82Y 20/00* (2011.01)
(Continued)

(52) U.S. Cl.
CPC .............. *C09K 11/54* (2013.01); *B82Y 20/00* (2013.01); *C09K 11/025* (2013.01);
(Continued)

(58) Field of Classification Search
CPC ........................................................ H01B 1/02
See application file for complete search history.

(56) References Cited

U.S. PATENT DOCUMENTS 7,632,428 B2 12/2009 Peng
7,645,397 B2 1/2010 Parce
(Continued)

FOREIGN PATENT DOCUMENTS

WO WO2004/066361 8/2004
WO WO2009/014707 1/2009

OTHER PUBLICATIONS

Manna et al., "Epitaxial Growth and Photochemical Annealing of Graded CdS/ZnS Shells on Colloidal CdSe Nanorods", J. Am. Chem. Soc., vol. 124, No. 24, 7136-7145 (2002).
(Continued)

*Primary Examiner* — William Young
(74) *Attorney, Agent, or Firm* — Lynne M. Blank, Esq.

(57) ABSTRACT

The present invention relates to low reabsorbing semiconductor nanocrystals having, simultaneously, an emission center core surrounded by at least one absorbing shell capable of absorbing blue or purple light and a protective exterior shell. The emission center core is capable of emitting at least one different wavelength range of light. The low reabsorbing semiconductor nanocrystals demonstrate an absorbance ratio greater than or equal to 10. These low reabsorbing semiconductor nanocrystals can be used in optical applications, some of which can include, for example, light-emitting diodes, solid-state-lighting, solar cells, lasers, and biomedical tags.

15 Claims, 3 Drawing Sheets

Schematic diagram of LR dots

(51) Int. Cl.
  *C09K 11/02* (2006.01)
  *C09K 11/88* (2006.01)
  *G02B 5/22* (2006.01)
  *H01B 1/02* (2006.01)
  *B82Y 30/00* (2011.01)

(52) U.S. Cl.
  CPC ............. *C09K 11/883* (2013.01); *G02B 5/22* (2013.01); *B82Y 30/00* (2013.01); *G02B 2207/101* (2013.01); *H01B 1/02* (2013.01); *Y10S 977/774* (2013.01); *Y10S 977/824* (2013.01)

(56) References Cited

U.S. PATENT DOCUMENTS

| | | |
|---|---|---|
| 7,767,260 B2 | 8/2010 | Peng |
| 7,892,452 B2 | 2/2011 | Ryowa |
| 9,412,905 B2 | 8/2016 | Su et al. |
| 2008/0001538 A1 | 1/2008 | Cok |
| 2008/0074050 A1 | 3/2008 | Chen |

OTHER PUBLICATIONS

Xie et al, "Synthesis and Characterization of Highly Luminescent CdSe-Core CdS/Zn 0.5Cd0.5S/ZnS Multishell Nanocrystals", J. Am. Chem. Soc., vol. 127, No. 20, 7480-7488 (2005).

Chen et al., "'Giant' Multishell CdSe Nanocrystal Quantum Dots with Suppressed Blinking", J. Am. Chem. Soc., vol. 130, No. 15, 5026-5027 (2008).

Yeh et al., "Making white-light-emitting diodes without phosphors", SPIE Newsroom. DOI: 10.1117/2.1200802.1069, Mar. 12, 2008, p. 1.

US 9,580,647 B2

SIMULTANEOUS OPTIMIZATION OF ABSORPTION AND EMISSION OF NANOCRYSTALS

CROSS REFERENCE TO RELATED APPLICATIONS

This application is the national phase application PCT/US2010/001873, entitled "Simultaneous Optimization Of Absorption and Emission Of Nanocrystals" filed on Jun. 30, 2010 under 35 U.S.C. 371, which claims priority to U.S. Provisional Patent Application Ser. No. 61/139,160 by D Battaglia et al., entitled "Simultaneous Optimization Of Absorption and Emission Of Nanocrystals", flied, on Mar. 1, 2010, the disclosures of which are incorporated herein by reference.

FIELD OF THE INVENTION

The present invention relates to optimized semiconductor nanocrystals having, simultaneously, an emission center surrounded by at least one absorbing shell and a protective exterior shell.

BACKGROUND OF THE INVENTION

Colloidal semiconductor nanocrystals are nanometer-sized fragments of the corresponding bulk crystals, which have generated fundamental interest for their promise in developing advanced optical materials. The size-dependent emission is probably the most attractive property of semiconductor nanocrystals. For example, differently sized CdSe nanocrystals can be prepared that emit from blue to red, with comparatively pure color emissions. These nanocrystal-based emitters can be used for many purposes, such as for light-emitting diodes, solid-state-lighting, solar cells through frequency down conversion, lasers, biomedical tags, and the like.

For any application of semiconductor nanocrystals as emitters, photoluminescence (PL) quantum yield (QY) is a basic and well accepted requirement. However, this previous work has not recognized that the absorption of the nanocrystals is as important as their PL QY. In applications, such as solid-state-lighting, solar cells through frequency down conversion, and some types of biomedical applications, the absorption of the nanocrystals should be as high as possible at the excitation wavelength but as low as possible at the emission wavelengths. This means that the main absorption band should reduce sharply when the wavelength is longer than the excitation wavelength, implying a separate main absorption band and emission peak. To obtain semiconductor nanocrystals with both desired emission properties and absorption properties is a challenge. This becomes even more difficult, as the focus in the field has been only on the emission properties in the past. There remains a need for nanocrystals with absorption as high as possible at the excitation wavelength and as low as possible at the emission wavelengths.

One type of useful nanocrystalline material is the core/shell nanocrystal, which features a nanocrystalline core of one type material, coated with a shell of another type material. Core/shell nanocrystals are representative of a number of different complex structured nanocrystals, such as core/shell/shell structured materials, the architectures of which are aimed at providing fine control over the nanocrystal's photophysical properties. Previously, the main goal has been to boost the emission properties, including the photoluminescence (PL) quantum yield (QY) and the photostability, of the nanocrystals. There remains a need for nanocrystals with optimized absorption properties of the nanocrystals through core/shell nanocrystals.

Shells of graded composition, which are multiple monolayers in thickness, are known. See, for example, Liberato Manna, Erik C. Scher, Liang-Shi Li, and A. Paul Alivasatos, "*Epitaxial Growth and Photochemical Annealing of Graded CdS/ZnS Shells on Colloidal CdSe Nanorods*", J. Am. Chem. Soc., Vol. 124, No. 24, 7136-7145 (2002) (referred to herein as "Alivasatos"); Renguo Xie, Ute Kolb, Jixue Li, Thomas Basche, and Alf Mews, "*Synthesis and Characterization of Highly Luminescent CdSe-Core CdS/Zn 0.5Cd0.5S/ZnS Multishell Nanocrystals*", J. Am. Chem. Soc., Vol. 127, No. 20, 7480-7488 (2005) (referred to herein as "Mews"), both incorporated herein by reference in their entirety. A graded shell composition is useful because the core and shell semiconductors generally have different lattice constants, which can cause significant lattice mismatch. Although graded shell composition are known, all graded systems are designed with the core as the central concern. The entire shell—including the graded part—is considered as a "protection layer" to boost the emission properties of the nanocrystals. See, for example, WO 2009/014707 to Kazlas, pg. 36. Such a protection layer is thought to prevent the photogenerated charges from being exposed onto the surface of the nanocrystals. The protection layer should thereby increase the photoluminescence (PL) quantum yield (QY) by offering a higher chance for the charges to recombine within the core of the nanocrystals and enhance the photostability by eliminating photochemical reactions on the surface of the nanocrystals. Papers published by the Alivisatos group and the Mews group could be considered as typical examples of such core/graded shell/shell nanocrystals.

The "Alivisatos" paper discusses growth of ZnS shell(s) onto CdSe nanorods with CdS as the graded shell between the core and outer ZnS shell to improve the photoluminescence (PL) quantum yield (QY). The photoluminescence (PL) quantum yield (QY) of the resulting CdSe/CdS/ZnS core/shell/shell nanorods is about 10-20%, which is not very high but is significantly improved in comparison to the core nanorods. The "Mews" paper, using a new growth technique (successive-layer-adsorption-and-reaction, SILAR, as described in WO 2004/066361 and U.S. Pat. Pub. No. 2007/0194279, both incorporated herein by reference in their entirety), discloses the growth of CdSe/CdS/Cd$_{0.5}$Zn$_{0.5}$S/ZnS core/shell/shell/shell nanocrystals to minimize the lattice mismatch between the CdSe core and the ZnS outer shell, about 12%. The photoluminescence (PL) quantum yield (QY) in "Mews" is as high as 70-85%, but the authors don't pay attention to optimizing the absorption properties. In other words, the middle CdS and Cd$_{0.5}$Zn$_{0.5}$S are introduced as pure "lattice matching" layers. A nanocrystal (CdSe/thick CdS/ZnS core/shell/shell) synthesized by using SILAR, as disclosed in Yongfen Chen, Javier Vela, Han Htoon, Joanna L. Casson, Donald J. Werder, David A. Bussian, Victor I. Klimov, and Jennifer A. Hollingsworth, "'*Giant' Multishell CdSe Nanocrystal Quantum Dots with Suppressed Blinking*", J. Am. Chem. Soc., Vol. 130, No. 15, 5026-5027 (2008) (referred to herein as "Chen"), incorporated herein by reference, has quite poor emission properties, but the thick CdS shell offers excellent absorption properties although the authors did not intend the absorption properties of their nanocrystals.

Problem to be Solved

There remains a continuing need for semiconductor nanocrystals with both optimal absorption and optimal emission, which separate the main absorption band from the emission peak and possess a high absorption coefficient at the excitation wavelength as well as a high photoluminescence (PL) quantum yield (QY).

SUMMARY OF THE INVENTION

The present invention relates to a low reabsorbing semiconductor nanocrystal comprising an emission-center core, an exterior protective shell and at least one inner absorbing shell between the emission-center core and the exterior protective shell, wherein the inner absorbing shell is capable of absorbing a fixed wavelength range of light of a light source and the emission-center core is capable of emitting at least one different wavelength range of light. The present invention also relates to a low reabsorption semiconductor nanocrystal comprising an emission-center core, an exterior protective shell and at least one inner absorbing shell between the core and the exterior protective shell, wherein the absorbance ratio of the low reabsorption semiconductor nanocrystal is greater than or equal to 8 and, simultaneously, the emission quantum yield is greater than or equal to 50%.

Advantageous Effect of the Invention

The present invention includes several advantages, not all of which are incorporated in a single embodiment. The main advantage of the disclosed design in terms of function is that the optimized semiconductor nanocrystals minimize undesired quenching through reduced reabsorption energy transfer. This advantage is crucial for any application when a high concentration of nanocrystals, a close proximity between nanocrystals, and/or a long optical path length are needed.

DETAILED DESCRIPTION OF THE INVENTION

Figure 1:
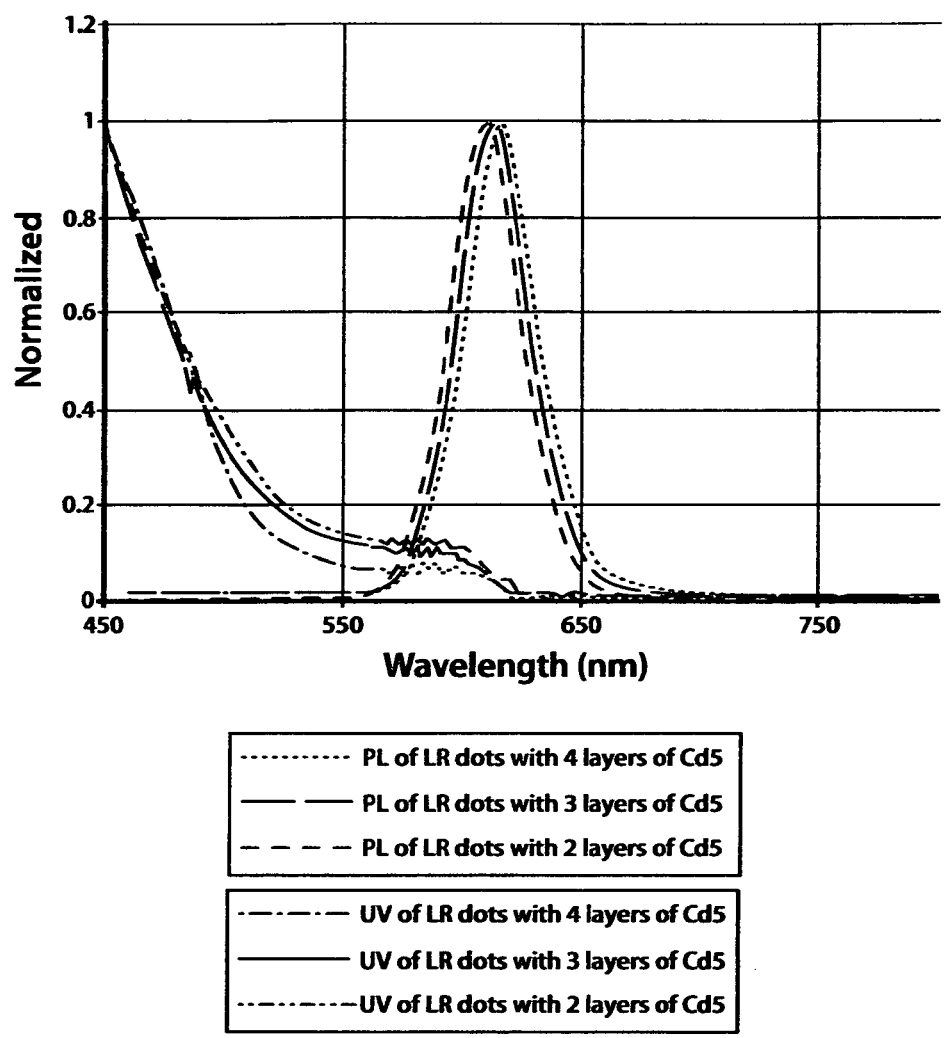
FIG. 1 represents a plot of the UV and photoluminescence (PL) spectra of CdSeS/CdS/ZnS core-shell nanocrystals.

The present invention discloses a semiconductor nanocrystal comprising an emission-center core, an exterior protective shell and an inner absorbing alloy shell between the core and the exterior protective shell. The disclosed semiconductor nanocrystals having, simultaneously, an emission center surrounded by at least one absorbing shell and a protective exterior shell are especially suited for use in lighting.

The central goal of this invention is to maximize the absorption at the excitation wavelength and minimize the absorption at the emission wavelength of interest. Thus, the absorption zone in a nanocrystal must have a very large, controllable, tunable volume in comparison to the emission zone. The lattice of the entire complex nanocrystal can be mostly dictated by the large volume portion of the nanocrystal. Consequently, it is desirable to design the lattice matching around this large volume portion—the absorption zone—to minimize the complexity of the entire nanocrystal structure. Traditionally, lattice matching is centered around the core of a nanocrystal because the target has been the emission properties of the nanocrystals. This does not work if an application requires certain absorption properties.

The decoupling of excitation and emission in doped semiconductor nanocrystals results in a large Stokes' shift (well separated absorption and emission bands) reducing self-quenching of the emission to zero. A large Stokes' shift can be obtained using specially designed intrinsic quantum dots, so-called low-reabsorption quantum dots (LR dots). As used herein, "reabsorption" refers to a process in which the emission from one emitter is optically absorbed again by the same type of emitter or a different type of emitter. Conversely, the intrinsic excitonic emission of quantum dots of the prior art demonstrates substantial self-quenching. See Pradhan, N.; Goorskey, D.; Thessing, J.; Peng, X., *An Alternative of CdSe Nanocrystal Emitters: Pure and Tunable Impurity Emissions in ZnSe Nanocrystals*. Journal of the American Chemical Society 2005, 127 (50), 17586-17587; Pradhan, N.; Peng, X., *Efficient and Color-Tunable Mn-Doped ZnSe Nanocrystal Emitters: Control of Optical Performance via Greener Synthetic Chemistry*. Journal of the American Chemical Society 2007, 129 (11), 3339-3347. LR dots possess separate absorption and emission centers with an additional outer protection zone.

Colloidal semiconductor nanocrystals are nanometer-sized fragments of the corresponding bulk crystals, which have generated fundamental interest for their promise in developing advanced optical materials. In the past, scientists and engineers paid close attention to the size-dependent emission of semiconductor nanocrystals. Differently sized nanocrystals can be prepared that emit from a specific color range, with comparatively pure color emissions. In this invention, however, the emission color of the semiconductor nanocrystals is not solely determined by the size of the semiconductor nanocrystals. In order to achieve desired optical performance in the devices, the emission color of the semiconductor nanocrystals will be mainly tuned by composition and structure of the semiconductor nanocrystals, although their size sometimes remains as one of the means for color tuning.

Types of semiconductor nanocrystals include plain core nanocrystals and nanocrystalline cores coated with at least one layer of another semiconductor material, commonly referred to as core/shell nanocrystals. The shell layer(s) may be the same or different from the nanocrystalline core material. Core/shell nanocrystals are likely to be the desired structures when the nanocrystals either undergo complicated chemical treatments, such as in bio-medical applications, or when the nanocrystals are constantly excited, such as for LEDs and lasers. Core/shell nanocrystals are representative of a number of different complex structured nanocrystals, such as core/shell/shell structured materials, the architectures of which are aimed at providing fine control over the nanocrystal's photophysical properties. The LR dots disclosed in this invention are mostly likely in a form of core/shell structure.

Core/shell semiconductor nanocrystals, in which the core composition differs from the composition of the shell that surrounds the core, are useful for many optical applications. If the band offsets of the core/shell structures are type-I, and the shell semiconductor possesses a higher bandgap than the core material does, then the photo-generated electron and hole inside a nanocrystal will be mostly confined within the core. As used herein, type-I band offsets refer to a core/shell electronic structure wherein both conduction and valence bands of the shell semiconductor are simultaneously either higher or lower than those of the core semiconductor. Conventional core/shell nanocrystals can show high photoluminescence (PL) and electroluminescence efficiencies and can be more stable against photo-oxidation than "plain core" semiconductor nanocrystals comprising a single material, provided that the bandgap of the core semiconductor is smaller than that of the shell semiconductor.

Although not limited to II-VI and III-V semiconductors, the complex nanocrystals disclosed here can be readily realized using these two families of semiconductors and their alloys, which have similar crystal structure and tunable lattice constants. Furthermore, these two families of semiconductors are mostly direct bandgap. As used herein, the term II/VI compound or II/VI material refers to a compound comprising a group II element (also referred to as a group 12 element) and a group VI element (also referred to as group 16 element). As used herein, the term III/V compound or III/V material refers to a compound comprising a group III element (also referred to as a group 13 element) and a group V element (also referred to as group 15 element).

The core is a semiconductor nanocrystalline material, typically the combination of at least one metal and at least one non-metal. The core is prepared by combining a cation precursor(s) with an anion precursor(s). The metal for the host (or the plain core) is most preferably selected from Zn, Cd, Hg, Ga, In, Ti or a rare earth. The term rare-earth or rare-earth metal, as used herein, refers to the lanthanides, the actinides, and Sc, Y, and La. Thus, in this aspect, Sc, Y, and La are encompassed by the terms transition metal and rare-earth metal. The non-metal is most preferably selected from O, S. Se, P, As, or Te. The cationic dopant ions could include all transition metals and rare earth elements, and the anionic dopant ions may be chosen from O, S, Se, Te, N, P, As, F, Cl, and Br. As used herein, transition metals include, but are not limited to, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Also as used herein, including in the context of providing core materials, Sc, Y, and La are also considered transition metals.

The cation precursors can comprise elements or compounds, for example, elements, covalent compounds, or ionic compounds, including but are not limited to, oxides, hydroxides, coordination complexes or metal salts, that serve as a source for the electropositive element or elements in the resulting nanocrystal core or shell material.

The cation precursor solution can comprise a metal oxide, a metal halide, a metal nitride, a metal ammonia complex, a metal amine, a metal amide, a metal imide, a metal carboxylate, a metal acetylacetonate, a metal dithiolate, a metal carbonyl, a metal cyanide, a metal isocyanide, a metal nitrile, a metal peroxide, a metal hydroxide, a metal hydride, a metal ether complex, a metal diether complex, a metal triether complex, a metal carbonate, a metal phosphate, a metal nitrate, a metal nitrite, a metal sulfate, a metal alkoxide, a metal siloxide, a metal thiolate, a metal dithiolate, a metal disulfide, a metal carbamate, a metal dialkylcarbamate, a metal pyridine complex, a metal bipyridine complex, a metal phenanthroline complex, a metal terpyridine complex, a metal diamine complex, a metal triamine complex, a metal diimine, a metal pyridine diimine, a metal pyrazolylborate, a metal bis(pyrazolyl)borate, a metal tris(pyrazolyl)borate, a metal nitrosyl, a metal thiocarbamate, a metal diazabutadiene, a metal dithiocarbamate, a metal dialkylacetamide, a metal dialkylformamide, a metal formamidinate, a metal phosphine complex, a metal arsine complex, a metal diphosphine complex, a metal diarsine complex, a metal oxalate, a metal imidazole, a metal pyrazolate, a metal-Schiff base complex, a metal porphyrin, a metal phthalocyanine, a metal subphthalocyanine, a metal picolinate, a metal piperidine complex, a metal pyrazolyl, a metal salicylaldehyde, a metal ethylenediamine, a metal triflate compound, or any combination thereof. Preferably, the cation precursor solution can comprise a metal oxide, a metal carbonate, a metal bicarbonate, a metal sulfate, a metal sulfite, a metal phosphate, metal phosphite, a metal halide, a metal carboxylate, a metal hydroxide, a metal alkoxide, a metal thiolate, a metal amide, a metal imide, a metal alkyl, a metal aryl, a metal coordination complex, a metal solvate, a metal salt, or a combination thereof. Most preferably, the cation precursor is a metal oxide or metal salt precursor and can be selected from zinc stearate, zinc myristate, zinc acetate and manganese stearate.

Anion precursors can also comprise elements, covalent compounds, or ionic compounds that serve as a source for the electronegative element or elements in the resulting nanocrystal. These definitions anticipate that ternary compounds, quaternary compounds, and even more complex species may be prepared using the methods disclosed herein, in which case more than one cation precursor, more than one anion precursor, or both, may be used. When dual or multiple cation elements were used in the growth of a given monolayer, the resulting nanocrystals were cation-doped at the given monolayer if the other part of the nanocrystals contained only a single cation. The same method can be used for the preparation of anion-doped nanocrystals.

In one aspect of this invention, the methods disclosed herein are applicable to core/shell nanocrystals prepared using a range of cation precursor compounds for the core and the shell material, for example, precursors of the group II metals (for example, Zn, Cd, or Hg), the group III metals (for example, Al, Ga, or In), the group IV metals (for example, Ge, Sn or Pb), or the transition metals (including, but not limited to, Ti, Zr, Hf, V, Nb, Ta, Cr, Mo, W, Mn, Tc, Re, Fe, Ru, Os, Co, Rh, Ir, Ni, Pd, Pt, Cu, Ag, Au, and the like).

The preferred core material may be selected from CdSe, CdS, CdTe, CdO, ZnSe, ZnS, ZnO, ZnTe, HgSe, HgS, HgTe, HgO, GaAs, GaP, InP, InAs, $In_2O_3$, TiO2 or a rare earth oxide. The core can comprise a II/VI compound or a III/V compound. The preferred group II elements are Zn, Cd, or Hg and the preferred group VI elements are O, S. Se, or Te. The preferred group III elements are B, Al, Ga, In, or Tl and the preferred group VI elements are N, P, As, Sb, and Bi.

The shell material is typically the same type of material chosen for the core. The composition of the shell or shells may be the same or different than the composition of the core to allow a narrow size distribution of core/shell nanocrystals to be attained as the growth of a shell material proceeds.

In this aspect, essentially all the shell precursor material added into a solution of the core nanocrystals grows exclusively onto the core nanocrystals. Again, while not intending to be bound by theory, it is believed that nearly monodisperse core/shell and other complex structured nanocrystals have also been possible by, among other things, shell growth that not only proceeds at substantially the same rate, but also initiates at substantially the same time at each nanocrystalline core site.

The solution phase epitaxial method achieves growth of the shell material onto the core material typically one monolayer per reaction cycle, by alternating injections of the cationic and anionic solutions into the reaction mixture. One reaction cycle refers to two consecutive injections of the reaction precursors, one for the cationic (anionic) precursor solution and the following one for the anionic (cationic) precursor solution.

The inner absorbing alloy shell can be more than one monolayer and the more than one monolayer can provide an alloy compositional gradient.

The present invention relates to semiconductor nanocrystals having, simultaneously, an emission center surrounded by at least one absorbing shell and a protective exterior shell. The inventive semiconductor nanocrystals are frequently referred to herein as low reabsorption dots, or LR dots. The LR dots can have an internal compositional gradient, which provides both optimal absorption and emission, which should separate the main absorption band from the emission peak and which possess high absorption coefficient at the excitation wavelength as well as high photoluminescence (PL) quantum yield (QY). This invention solves the above challenge by physically dividing a nanocrystal into three different zones, one emission zone (usually the core), one absorption zone (usually the inner shell), and a protection zone (the outer shell). In terms of lattice matching, this invention centers the entire design around the absorption zone, which is different from existing core/shell/shell nanocrystals. The LR dots possess separate absorption and emission centers with an additional outer protection zone. As such, LR dots have a large Stokes' shift (well separated absorption and emission bands) with reduced self-quenching of the emission to zero. In contrast, the intrinsic excitonic emission of quantum dots of the prior art, whose electronic properties are dictated by its band structure, including conduction band, valence band, bandgap, shows substantial self-quenching.

The LR-dots disclosed here are optimized for both absorption and emission properties, i.e., with a low reabsorption and high emission yield. High emission yield, preferably of at least 50%, can be readily specified by the commonly used photoluminescence quantum yield, which is defined as the number of photons emitted by the nanocrystals divided by the number of photons absorbed by the same nanocrystals. For low reabsorption, there is no existing parameter in nanocrystal literature to describe such properties. In this disclosure, we define "absorbance ratio" to fulfill this goal. Ideally, a nanocrystal emitter should absorb as many high energy photons from the excitation light source as needed and not absorb any photons in the lower energy window at all.

In one option, "absorbance ratio" is defined as the ratio of the absorbance at the peak of the excitation light source to the absorbance at 550 nm. If the emission peak of the nanocrystals locates at a wavelength higher than 550 nm, this option works well. The reason to choose 550 nm is because 550 nm is the most sensitive wavelength for human eyes under ambient conditions. As a result, it is critical not to quench this part of the emission of a device, which is extremely important for the lighting and display industry. This absorbance ratio is termed as "$I_{excitation}/I_{550}$" in this disclosure. For example, if the excitation peak of a blue LED is at 450 nm (a common peak position for a high power and high efficiency blue LED), the relevant absorbance ratio is "$I_{450}/I_{550}$".

Alternatively, one can define "absorbance ratio at the emission peak" that is calculated by dividing the absorbance at the peak of the excitation light source and the absorbance at the emission peak of the nanocrystals. This parameter is written as "$I_{excitation}/I_{emission}$" in this disclosure. For example, if the peak of excitation light source is 450 nm, "absorbance ratio at the emission peak" is "$I_{450}/I_{emission}$".

Obviously, the higher the absorbance ratio (in either of two definitions described above) is, the better a nanocrystal sample is for lighting and display applications. This is particularly true for nanocrystal emitters with their emission peak at a wavelength longer than 550 nm. However, it should be emphasized again that a high absorbance ratio (in either of two forms) must be coupled with a high emission quantum yield, preferably of at least 50%, which is the central goal of this invention.

Typically, the emission center (low bandgap semiconductor) is placed in the middle or core of the LR dot and the absorption zone (medium bandgap semiconductor) is epitaxially grown onto the emission core. The protection zone (wide bandgap semiconductor or insulator) at the outermost shell of the LR dot provides needed chemical and photostability for the LR dots. Because the bandgap of the emission center is significantly narrower than that of the absorption zone and the absorption zone has a significantly large absorption cross-section in comparison with the emission center, the emission spectrum and absorption spectrum of the LR dot sample is well separated. By tuning the composition and structure of the LR dots, one can readily vary the emission color of the resulting LR dots. The LR dot's emission color is not tightly related to the size of the dot, or, not only dependent on the size of the dot. Instead, the composition and structure along with the physical dimension dictate the optical properties LR dots.

For example, when the excitation comes from a typical blue LED (in the wavelength range between 440 and 470 nm) for solid-state-lighting, CdS is a good choice for the absorption zone. In another example, if the excitation is from a purple LED for making a red LED through frequency down-conversion, ZnSe or $ZnSe_xS_{1-x}$, wherein x is equal to 1 or a positive number less than 1, is a good candidate as the absorption zone. For a third example, if one wants to obtain near infrared emission from quantum dots for bio-medical applications (700-1000 nm) by using a red light source, CdSe should work as the absorption zone.

In typical core/shell quantum dots, the core is designed for absorption and emission while the shell is designed for protection. According to the present invention, the dots have a core, middle shell and outer shell. In this design the middle layer provides the absorption while the core provides the emission. These nanocrystals behave like doped quantum dots, where the host provides the absorption and the dopant provides the emission, but the present quantum dots are 'intrinsic quantum dots' without any dopant. A graded shell can minimize the interface defects between the core and shell materials by improving lattice matching and reducing lattice strain within a quantum dot according to the present invention, especially at the interface between its emission zone and absorption zone.

The main advantage of the present design in terms of function is that the semiconductor nanocrystals minimizes undesired quenching through reduced reabsorption energy transfer. This advantage is desirable for any application when a high concentration of nanocrystals, a close proximity between nanocrystals, and/or a long optical path length are needed. However, this advantage is substantial only if the emission quantum yield is sufficiently high, which is realized by several factors. Firstly, the physical separation of the absorption and emission minimizes Auger effect and other non-linear processes. Secondly, judiciously designing the structure/composition of the nanocrystals eliminates charge trap states within the emission zone and absorption zone. Thirdly, the protection zone (most outer shell) forces the photo-generated (or electro-injected in the case of electroluminescence) charges to efficiently fall into the emission zone.

The advantage in function comes from the structural advantages of the design, which include several aspects.

(1) Structurally, the emission zone is chosen as the core of a nanocrystal and the absorption zone is its inner shell. In this way, the emission center is located farthest from the surface of the nanocrystal to ensure efficient emission. The absorption zone is the inner shell, which has a large volume to offer a extremely high absorption coefficient at the excitation wavelength (volume increases as a cubic function of the radius). To maximize the absorption coefficient, the absorption zone must be a direct bandgap semiconductor.

(2) The bandgap of absorption zone must be larger than the emission zone, and the band offsets between two zones must be type-I. Type-I band offsets means that the conduction band (valence band) of one semiconductor is higher (lower) than that of the other semiconductor. However, in most cases, the absorption zone can reduce the quantum confinement of the exciton in the emission zone in a controllable fashion. As a result, the emission wavelength of the resulting nanocrystal is tunable.

In most cases, the lattice constants of the absorption zone and emission zone are different. To achieve a high emission efficiency, it is critical to adjust the lattice constants by varying the compositions. In this invention, the lattice matching is centered at the absorption zone. The lattice structures of the core, at least one inner alloy shell and exterior protective shell have a lattice mismatch of 13% or less. For example, if ZnSe is chosen as the absorption zone and the emission wavelength targets 620 nm (red), the core material can chose either InP—ZnSe alloy or CdSe—ZnSe alloy, which can reduce the lattice mismatch down to 2-3% readily. Alternatively, pure InP (or pure CdSe) can also selected as the emission zone (the core). In this alternative choice, a thin (1-2 monolayers) and graded InP—ZnSe (or CdSe—ZnSe) alloy shell will be inserted between the core and the ZnSe shell.

As disclosed above, the absorption zone has a large volume in comparison to the emission zone. As a result, the absorption zone plays the biggest role in determining the lattice strain in the resulting nanocrystals. In addition, when the absorption band is chosen, such as the light from a 450 nm blue LED, the material choice of the absorption zone will be determined accordingly, and thus not suited for modifying its lattice constant. For these reasons, the current invention emphasizes lattice engineering with the absorption zone as the center of the design.

Figure 3:
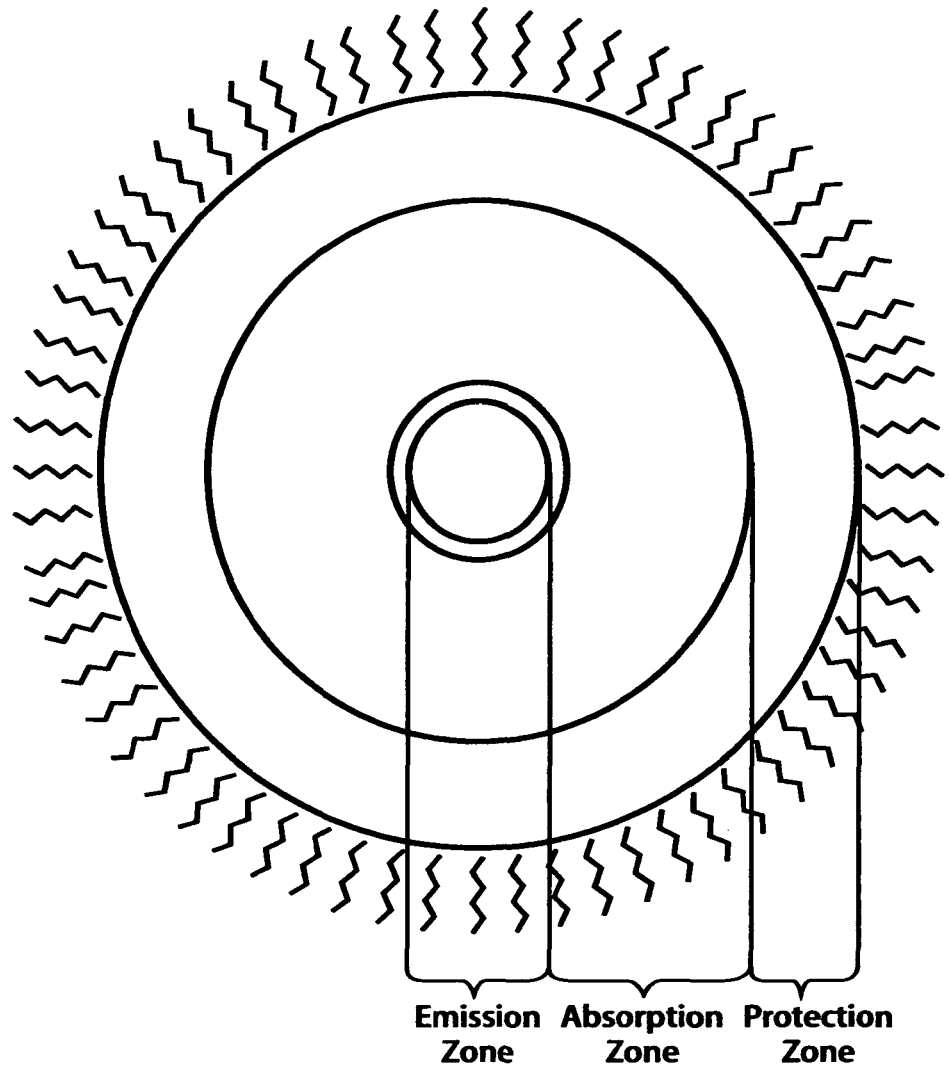
FIG. 3 represents the schematic diagram of the nanocrystal structure, including emission zone (core), transitional layers between the core and the inner shell, absorption zone (inner shell) and protection zone (outer shell).

The composition of the emission zone (the core) can be tuned and transition layers can be placed between the absorption zone (inner shell) and the protection zone (outer shell). This is illustrated in FIG. 3. There is preferably a transitional series of layers located between the emitting core and the absorbing inner alloy shell. For example, if CdS is chosen as the absorption zone and a typical red emitter, such as 620 nm, is targeted, the emission zone could be a $CdSe_xS_{1-x}$ core nanocrystal. By decreasing x in this formula to about 0.5, one could reduce the lattice mismatching down to about 2-3%. For the same example, if ZnS is chosen as the protection zone, $Cd_xZn_{1-x}S$ could be used as the transition layer between the absorption zone and protection zone, in which x for each monolayer increases from the CdS zone to the ZnS zone. The lattice mismatch in between CdS and ZnS is about 8% and can be reduced to about 1% between CdS and $Cd_xZn_{1-x}S$ if x is around 0.9. In this way, the lattice mismatch will be taken care of very efficiently. The resulting nanocrystals showed a photoluminescence (PL) quantum yield in the range between 70-90%.

For a typical nanocrystal, the core can have a dimension of from about 1 to 10 nm, the inner shell layer(s) can have a thickness of from about 1 to 100 nm, and the exterior protection layer can have a thickness of from about 1 to 1000 nm.

To make the main absorption band efficiently separated from the emission peak, the thickness of the absorption zone (inner shell next to the core) usually should have a substantially greater volume than the emission zone (the core, or a part of the core). Though the exact thickness shall be determined by the volume extinction coefficients of the absorption zone and emission zone, two to twenty monolayers of the chosen material (a relatively wide bandgap semiconductor in comparison to the emission zone) would be typical for an emission zone with a size of about 2 nm. For typical II-VI and III-V semiconductors, this special example should gives an absorption zone approximately being about 5 to 500 times in volume of the emission zone.

From the discussion above, one can see that it would be very advantageous to use a small emission core. The emission peak position of the resulting nanocrystals, however, is tunable by allowing the excitons centered at the emission zone to partially delocalize into the absorption zone. In other words, one can tune the bandgap emission peak by designing the absorption layer as well.

Usually, the transition layers between absorption zone and protection zone can also offer some absorption properties because such transition layers can have a composition close to the absorption layer. For example, if CdS is chosen as the absorption zone and ZnS is chosen as protection zone, one could use $Cd_xZn_{1-x}S$ as the transition layers. When x is greater 0.5, it could contribute some absorption to wavelengths above about 460 nm.

It should be pointed out that the emission zone and the absorption zone do not need to be a pure semiconductor. To achieve a certain absorption band, one might use an alloyed absorption shell with a defined composition. Semiconductor science textbooks can teach one to tune the absorption band by alloying. It is desirable to engineer the lattice matching between these two critical zones.

For the preferred LR dots specifically designed to have an emission-center core and at least one absorbing shell and at least one protection shell, core/shell/shell structures are both nanometer sized and highly monodisperse and may include, but are not limited to, those from II-VI and III-V semiconductors. As pointed above, these could include alloys of these semiconductors. The emission zone (core) should have the narrowest bandgap and the protection zone (outer shell) should have the widest bandgap. The bandgap of the absorption zone (inner shell) should be in the middle of those of the emission zone and protection zone. The absorption zone should have significantly large absorption cross-section in comparison to the emission zone and protection zone.

FIG. 1 represents a plot of the UV and photoluminescence (PL) spectra of CdSeS/CdS/ZnS core-shell nanocrystals with different thickness of the absorption zone. The thickness growth of absorption shells (CdS) reduces the absorption of the resulting LR dots between 450 nm and emission peaks, meanwhile, increases the stock shifts or separation of absorption and emission positions. The reduction of the relative absorption in the wavelength range longer than about 520 nm is evident upon the thickness increase of the CdS inner shell (absorption zone). As reference, the absorbance at 450 nm was normalized for all samples.

Figure 2:
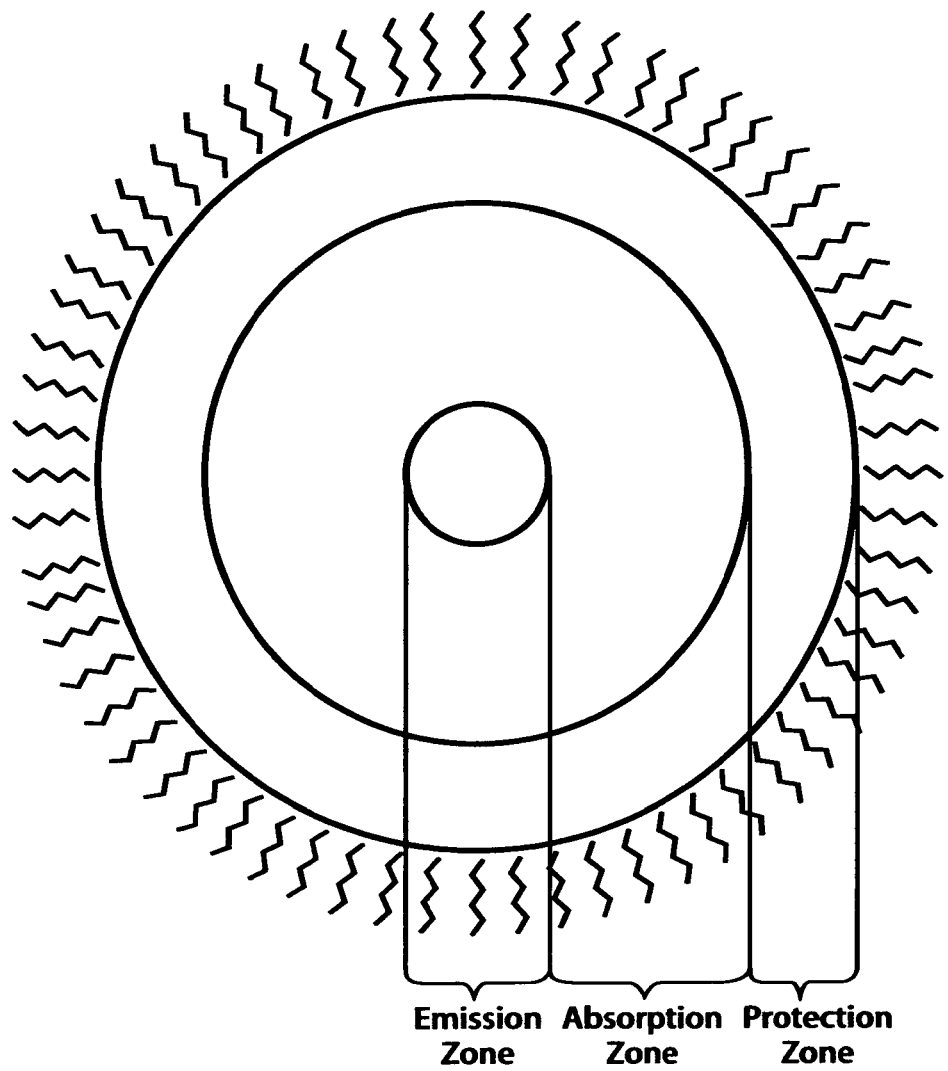
FIG. 2 represents the schematic diagram of the LR dot structure, including emission zone (core), absorption zone (inner shell) and protection zone (outer shell).

FIG. 2 represents the schematic diagram of the nanocrystal structure, including emission zone (core), absorption zone (inner shell) for adjusting reabsorption energy transfer, and the protection zone (outer shell) providing photostability.

The nanocrystals are prepared in a reaction utilizing solvent. The solvent can be a coordinating solvent or a non-coordinating solvent. The coordinating solvent can be selected from the group consisting of long-chain fatty amines, long-chain fatty acids, phosphine, phosphoric acids, and phosphine oxides. The solvent can be selected from the group consisting of octadecene (ODE), tributyl phosphine (TBP) and octadecylamine (ODA). The solvent can also be selected from the group consisting of dodecylamine (DA), hexadecylamine (HA), octadecylamine (OA), stearic acid (SA), lauric acid (LA), hexylphosphonic acid (HPA), tetradecylphosphonic acid (TDPA), and trioctylphosphine oxide (TOPO).

The non-coordinating solvent can be selected from water, hydrocarbon compounds, and other non-aqueous liquids. The non-coordinating solvent can also be selected from octadecene (ODE), ether, and ester.

The cation precursor solution may also include a ligand selected from a fatty acid, an fatty amine, a phosphine, a phosphine oxide, a phosphoric acid, a phosphinic acid, a sulphonic acid, or any combination thereof. The ligand may also be selected from a fatty acid, an fatty amine, a phosphine, a phosphine oxide, a phosphonic acid, a phosphinic acid, a sulphonic acid, or any combination thereof, any one of which having up to about 30 carbon atoms or any one of which having up to about 45 carbon atoms. The ligand can be selected from the group consisting of tributyl phosphine (TBP) and octadecylamine (ODA). The ligand can also be selected from the group consisting of dodecylamine (DA), hexadecylamine (HA), octadecylamine (OA), trioctylamine, oleyl amine, stearic acid (SA), lauric acid (LA), hexylphosphonic acid (HPA), tetradecylphosphonic acid (TDPA), and trioctylphosphine oxide (TOPO).

The ligands mentioned above can end up on the outer surface of the nanocrystals synthesized. When a mixture of ligands is used in a reaction system, the exact ligands to be found on the surface of the nanocrystals depend on the reaction conditions, coordination capability of the ligands, the mobility of the ligands on the surface of the nanocrystals, etc.

In addition, the present invention provides other types of colloidal materials including, but not limited to, quantum shells, quantum wells, 0D-2D nanocrystals, dual-emitting nanocrystals, and other complex structured nanocrystals.

The present invention also includes a method of making semiconductor nanocrystal quantum dots. The nanocrystals are preferably made by the methods described in U.S. Pat. Pub. No. 20070194279 and U.S. patent application Ser. No. 10/763,068, incorporated herein by reference in their entirety. The one-pot approaches comprise inherently "greener synthesis routes" (fewer materials, reduced use of hazardous materials, greater yields) and allow the decoupling of doping process from nucleation and/or growth processes. Pradhan, N.; Goorskey, D.; Thessing, J.; Peng, X., *An Alternative of CdSe Nanocrystal Emitters: Pure and Tunable Impurity Emissions in ZnSe Nanocrystals*. Journal of the American Chemical Society 2005, 127 (50), 17586-17587.

Generally, the semiconductor nanocrystals are made by combining a nanocrystal core, a ligand, and at least one solvent in a reaction vessel, forming a first monolayer of an inner alloy shell on said nanocrystal core by adding a first cationic precursor M1 and an anionic precursor X1 at T1, forming additional monolayers of the inner alloy shell by adding a first cationic precursor M1, a second cationic precursor M2 and an anionic precursor X1 while cooling to T2 followed by heating to T1 or greater, and forming a protective exterior shell by adding said second cationic precursor M2 and said anionic precursor X1 while cooling to T2.

Such nanocrystals disclosed here are of critical importance in solid-state-lighting, light-emitting-diodes, frequency down-conversion solar cells, and any other applications requiring when a high concentration of nanocrystals, a close proximity between nanocrystals, and/or a long optical path length are needed.

EXAMPLES

Example 1

Preparation of Reaction Solutions

Materials: Technical grade (90%) Octadecene (ODE), Indium acetate (In(Ac)3, 99.99%), Tri-n-octylphosphine (TOP, 97%), Stearic acid (SA, 98%), oleic acid (90%), Zinc stearate (ZnO 12.5-14%), Tris-trimethylsily phosphine (P(TMS)3, 95%) 1-octylamine (99%) were purchased from Alfa. Oleylamine (97%) and octadecylamine (ODA, 97%) were purchased from Adrich. Copper stearate was prepared in our lab. All the chemicals were used without further purification.

Precursor Solutions 0.1M Cd Solution:

Place 1.28 g CdO+22.5 g OA (oleic acid)+65.0 g ODE (1-Octadecene) in a 250 ml round bottom flask. Heat to 250° C. under argon flow until clear. Allow the solution to cool to room temperature and store the reaction mixture at room temperature. When needed, this mixture is re-heated to become clear as the Cd solution to be used below.

0.1M Zn Solution:

Place 1.215 g ZnO+33.9 g OA (oleic acid) (30 ml)+94.6 g ODE (1-Octadecene) in a 250 mL round bottom flask. Heat to 240° C. under argon flow until clear. Store the reaction mixture at room temperature. When needed, this mixture is re-heated to become clear as the Cd solution to be used below. 0.1M S solution:

Place 0.48 g S+118.5 g ODE (1-Octadecene) in a 250 mL round bottom flask. Cap the solution and heat it until all the S powder is completely dissolved. Once the Sulfur has dissolved in the ODE the reaction should be stable at room temperature. In some circumstances some of the Sulfur has precipitated out of the solution. If this happens, re-heat the solution until all the Sulfur is dissolved.

Synthesis of CdSe Core Nanocrystals

For a typical reaction, the mixture of 0.2 mmol of CdO, 0.8 mmol of stearic acid and 2 g of ODE in a 25 ml three neck flask is heated to about 200° C. to obtain colorless clear solution. After this solution is cooled down to room temperature, ODA (1.5 g) and 0.5 g TOPO are added into the flask. Under argon flow, this system is re-heated to 280° C. At this temperature, a selenium solution made by dissolving 2 mmol of Se in 0.472 g of TBP and further diluted with 1.37 g of ODE is quickly injected. The growth temperature is then reduced to 250° C. Typically this reaction generates CdSe nanocrystals of about 3.5 nm in size with the first absorption peak around 570 nm. The reaction mixture is allowed to cool down to room temperature, and a standard extraction procedure using hexanes/ODE-methanol two phase system is used to purify the nanocrystals from side products and unreacted precursors. The nanocrystals remain in the hexanes/ODE layer, and the unreacted precursors and excess amines are extracted into the methanol layer. The particle concentration of the purified CdSe solution in hexanes, as stock solution for core/shell growth, is measured using Beer's law. This solution will be used for the growth of the LR-dots.

Synthesis of LR-Dot Shell

For a typical reaction,

1. To a 250 mL 3-neck round bottom flask, add 15 g ODA (octadecylamine)+15 g ODE (octadecene)+2 g TOPO (trioctylphosphine oxide). Attach the reaction flask to a condenser.
2. Add a known amount of CdSe nanocrystals with its concentration determined above to the reaction flask. The hexane for dissolving the CdSe nanocrystals is boiled off with Ar flow. The growth of core/shell nanocrystals using the SILAR method is based on alternating injections of the Cd solution, Zn solution and S solution made using the procedures disclosed above into the solution containing the CdSe-core nanocrystals. The amount of the injection solution for each monolayer can be deduced from a calculation of the number of surface atoms using standard formula.
3. Add the first injection to the reaction while at room temperature. This is usually the first and second CdS layers, injected together.
4. Seal the reaction vessel and begin the flow of the inert gas. (It is necessary to keep sufficient positive internal pressure to eliminate any possible oxygen exposure from leaks. Furthermore it is necessary to overcome any flash boiling of low boiling temperature liquids formed during the reaction.)
5. Heat the reaction to 235° C. for at least 30 minutes.
6. Start the next layer by cooling the reaction down to 150° C. by adding the designated amount and type of injection solutions. Usually the cationic solution(s) is added first and followed by the S solution. The composition of this and the next few monolayers of shell can be pure CdS for high absorbance in the purple-blue window (>460 nm) and low absorbance in the green-yellow-orange-red window (approximately above 500 nm). For example, the absorbance ratio between 450 nm and 550 nm can be used for characterization of the re-absorption properties of the resulting LR-dots nanocrystals with a photoluminescence (PL) peak greater than 570 nm. Alternatively, this monolayer can be a mixed $Cd_xZn_{1-x}S$ shell by controlling the Zinc solution and Cd solution ratio.
7. After all the precursors have been added, heat the reaction to a temperature in the range between 230° C. and 260° C. for the growth of the next layer. Usually, the more Zn solution (in comparison to Cd solution) there is, the higher the reaction temperature should be.
8. Repeat steps 6-7 for each layer.
9. The progress of the reaction can be monitored through periodic measurements of the absorption (UV-Vis) and emission (Fluorometer) of the reaction.
10. The amount of precursors to inject for each layer is determined using a standard method based on the size, concentration, and crystal lattice of the nanocrystal system.
11. After the last injection the reaction is cooled down to purify using a standard hexanes/ODE-methanol extraction method. If a solid form of nanocrystals are needed, precipitation of the nanocrystals can be achieved by adding acetone, ethyl acetate, or other polar solvent into the nanocrystals dissolved in the hexanes/ODE solution.

Example 2

Synthesis of $CdSe_xS_{1-x}$ Alloy Core Nanocrystals

Separately, a selenium solution is made by dissolving 2 mmol of Se in 0.472 g of TBP and further diluted with 1.37 g of ODE in the glove box, and a sulfur solution is made according to the procedure described above. For synthesis of $CdSe_xS_{1-x}$ alloy core nanocrystals with given Se:S ratio, the Se solution and S solution are mixed with a desired proportion to obtain a mixed anionic injection solution.

For a typical reaction, the mixture of 0.2 mmol of CdO, 0.8 mmol of stearic acid and 2 g of ODE in a 25 ml three neck flask is heated to about 200° C. to obtain colorless clear solution. After this solution is cooled down to room temperature, ODA (1.5 g) and 0.5 g TOPO are added into the flask. Under argon flow, this system is re-heated to 280° C. At 280° C., the mixed anioic injection solution with a certain volume is then injected into the reaction solution. The reaction mixture is reduced to 250° C. and maintained at this temperature for 2 to 20 minutes, dependent on the size of the nanocrystals needed. The reaction mixture is allowed to cool down to room temperature, and a standard extraction procedure using hexanes/ODE-methanol two phase system is used to purify the nanocrystals from side products and unreacted precursors. The nanocrystals remain in the hexanes/ODE layer, and the unreacted precursors and excess amines are extracted into the methanol layer. The particle concentration of the purified CdSe solution in hexanes, as stock solution for core/shell growth, is measured using Beer's law. This solution will be used for the growth of the LR-dots.

Characterization of the Nanocrystals:

Transmission Electron Microscopy (TEM) and High resolution TEM (HR-TEM): The low-resolution TEM images are taken on a JEOL 100CX transmission electron microscope with an acceleration voltage of 100 kV. Carbon-coated copper grids are dipped in the hexanes or toluene solutions to deposit nanocrystals onto the film. High-resolution TEM (HRTEM) pictures are taken using a Taitan microscope with an acceleration voltage of 300 kV.

The other measurements: X-ray powder diffraction (XRD) patterns are obtained using a Philips PW1830 X-ray diffractometer. Energy-Dispersive Spectroscopy (EDS) is used for elemental analysis using a Philips ESEM XL30 scanning electron microscope equipped with a field emission gun and operated at 10 kV. UV-vis spectra are recorded on an HP8453 UV-visible spectrophotometer. Photoluminescence (PL) spectra are taken using a Spex Fluorolog-3 fluorometer. The PL quantum yields of the nanocrystals are measured using a standard integration sphere protocol (Ocean Optics).

Table 1 represents detailed data about the effect of absorption shell (CdS) thickness on the ratio of absorption intensity (I) at 450 nm, 550 nm and emission positions of the resulting LR dots. The absorbance ratio between 550 nm and 450 nm (column three) and between the absorbance at the emission peak and 450 nm is detailed.

TABLE 1

Characterization of core/shell dots with different layers of CdS

| Layers of CdS | Layers of ZnS | Factor = $I_{450}/I_{550}$ in UV spectra | Factor = $L_{450}/I$emission peak in UV spectra |
| --- | --- | --- | --- |
| 2 | 2 | 8 | 13.5 |
| 3 | 2 | 10 | 18.9 |
| 4 | 2 | 14 | 24.4 |

Example 3

LR Quantum Dot Film

A quantum dot film which has been fully cured in UV-curable polymer (see detailed properties and their preparation method in Examples 1 and 2) is placed in front of a LED source (single excitation wavelength @ 405 nm, 3.2V, 100 mA). The film thickness is 300 micrometer, the absorbance at 405 nm is around 1.2, which means around 94% incoming 405 nm photons will be absorbed by quantum dots. An anti-reflection film (3M CM592) is coated on the quantum dot film (facing LED source) so that all emitted photons can be collected by the integrating sphere behind the quantum dots film.

The LR dot film sample was mounted on the port of an integrating sphere such that all the excitation from the source went through the film into the integrating sphere and was then collected.

Terminology:

Power conversion efficiency (%)=$P_{ph}/P_L$;

405 nm punch through (%)=$P_{Lpth}/P_L$, $P_L$ is 405 nm excitation power; $P_{ph}$ is power of phosphor emission; $P_{Lpth}$ is power of punch through QE: quantum efficiency, as measured using an Ocean Optics integrating sphere and USB 2000+ spectrometer.

Data collected using Ocean Optics USB 2000+ spectrometer

TABLE 7

| | Power (350-470 nm) | Power (550-700 nm) |
| --- | --- | --- |
| No film | 4318 uW | 21 uW |
| Batch 4-200 μm | 173 uW | 537 uW |
| No film | 5507 uW | 28 uW |
| Batch 4-300 μm | 371 uW | 780 uW |

TABLE 8

| Sample ID | Punch Thru | QE | Power Conv. Eff. |
| --- | --- | --- | --- |
| Batch 4-200 μm | 6.3% | 45% | 16% |
| Batch 4-300 μm | 4% | 45% | 13% |

Note: 6.3% punch thru means that 93.7% source photons are absorbed by the quantum dots film while a 4% punch through means that 96% of the source photons are absorbed by the film. These examples clearly show how an LR dot film can be used to absorb substantially all of the excitation from the source LEDs and control fully the emission output from the device.

The invention has been described in detail with particular reference to certain preferred embodiments thereof, but it will be understood that variations and modifications can be effected within the spirit and scope of the invention.

The invention claimed is:

1. An undoped low reabsorbing semiconductor nanocrystal comprising an emission-center core, an exterior protective shell and at least one inner absorbing shell between said emission-center core and said exterior protective shell, wherein said inner absorbing shell is capable of absorbing a fixed wavelength range of blue or purple light of a light source and said emission-center core is capable of emitting at least one different wavelength range of light, and wherein the absorbance ratio of $I_{excitation}/I_{550}$ of the undoped low reabsorbing semiconductor nanocrystal is greater than or equal to 10, and wherein the undoped low reabsorbing semiconductor nanocrystal has well separated absorption and emission bands such that the absorption and emission bands do not overlap, wherein said inner absorbing shell comprises at least three monolayers, and wherein the inner absorbing shell is from 5 to 500 times in volume of the emission-center core.

2. The low reabsorbing semiconductor nanocrystal of claim 1 wherein said emission-center core comprises at least one member selected from the group consisting of ZnSe, CdSe, InP, $CdSe_xS_{(1-x)}$Se, $Cd_xZn_{(1-x)}$Se, $(InP)_xZnSe_{(1-x)}$, and combinations thereof, wherein x is equal to 1 or a positive number less than 1.

3. The low reabsorbing semiconductor nanocrystal of claim 1 wherein said absorbing shell is selected from the group consisting of ZnSe, CdS, $Cd_xZn_{(1-x)}$S, $ZnSe_xS_{(1-x)}$, and combinations thereof, wherein x is equal to 1 or a positive number less than 1.

4. The low reabsorbing semiconductor nanocrystal of claim 1 wherein said exterior protective shell is selected from the group consisting of ZnS, ZnO, and combinations thereof.

5. The low reabsorbing semiconductor nanocrystal of claim 1 wherein said fixed wavelength range of light is between 440-470 nm.

6. The low reabsorbing semiconductor nanocrystal of claim 1 further comprising at least one ligand located on the outer surface of said low reabsorbing semiconductor nanocrystal.

7. The low reabsorbing semiconductor nanocrystal of claim 1 wherein said absorbing shell comprises a plurality of monolayers forming a compositional gradient.

8. The low reabsorbing semiconductor nanocrystal of claim 1 wherein said emission-center core, said inner absorbing shell and said exterior protective shell each have a lattice structure, and wherein the lattice structures of said emission-center core, said inner absorbing shell and said exterior protective shell comprise a lattice mismatch of 13% or less.

9. The low reabsorbing semiconductor nanocrystal of claim 1 wherein the bandgap of said inner absorbing shell is larger than the bandgap of said emission-center core.

10. The low reabsorbing semiconductor nanocrystal of claim 9 wherein the bandgap of the exterior protective shell is larger than the bandgap of the inner absorbing shell.

11. The low reabsorbing semiconductor nanocrystal of claim 1 wherein the band off sets between said inner absorbing shell and said emission-center core are type-I.

12. The low reabsorbing semiconductor nanocrystal of claim 1 further comprising transitional layers between said emission-center core and said inner absorbing shell.

13. The low reabsorbing semiconductor nanocrystal of claim 1 further comprising transitional layers between said inner absorbing shell and said exterior protective shell.

14. The low reabsorbing semiconductor nanocrystal of claim 1 wherein the emission quantum yield is greater than or equal to 50%.

15. An undoped low reabsorbing semiconductor nanocrystal comprising an emission-center core, an exterior protective shell and at least one inner absorbing shell between said emission-center core and said exterior protective shell, wherein said emission-center core comprises an emission zone and wherein said at least one inner absorbing shell comprises an absorption zone between said emission-center core and said exterior protective shell, wherein said at least one inner absorbing shell is capable of absorbing a fixed wavelength range of light of a light source and said emission-center core is capable of emitting at least one different wavelength range of light, and wherein the undoped low reabsorbing semiconductor nanocrystal has well separated absorption and emission bands such that the absorption and emission bands do not overlap, wherein said inner absorbing shell comprises at least three monolayers, and wherein the absorption zone chosen as the light-absorbing inner shell is from 5 to 500 times in volume of the emission zone chosen as the emission-center core.

\* \* \* \* \*